United States Patent
Ochi et al.

(10) Patent No.: US 7,643,385 B2
(45) Date of Patent: Jan. 5, 2010

(54) OPTICAL PICKUP

(75) Inventors: Manabu Ochi, Fujisawa (JP); Katsuhiko Kimura, Kasumigaura (JP); Masaya Horino, Yasato (JP); Junichi Senga, Yokohama (JP); Masayoshi Watanabe, Yokohama (JP); Tetsuo Itou, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 829 days.

(21) Appl. No.: 11/191,940

(22) Filed: Jul. 29, 2005

(65) Prior Publication Data

US 2006/0087931 A1 Apr. 27, 2006

(30) Foreign Application Priority Data

Oct. 27, 2004 (JP) ............................. 2004-311685

(51) Int. Cl.
*G11B 7/00* (2006.01)
(52) U.S. Cl. .................................... 369/44.14
(58) Field of Classification Search ............. 369/44.15, 369/44.16, 44.14
See application file for complete search history.

(56) References Cited

U.S. PATENT DOCUMENTS

| | | | | |
|---|---|---|---|---|
| 5,264,968 A | * | 11/1993 | Masunaga | 369/44.16 |
| 5,313,334 A | * | 5/1994 | Tomiyama et al. | 369/44.16 |
| 6,625,091 B2 | * | 9/2003 | Obara | 369/44.14 |
| 2001/0043521 A1 | * | 11/2001 | Kato | 369/44.16 |
| 2003/0174596 A1 | * | 9/2003 | Wakabayashi et al. | 369/44.16 |

FOREIGN PATENT DOCUMENTS

JP 2002-150581 5/2002

* cited by examiner

*Primary Examiner*—Thang V Tran
(74) *Attorney, Agent, or Firm*—Antonelli, Terry, Stout & Kraus, LLP.

(57) ABSTRACT

To improve the reliability to an environmental temperature change of an optical pickup, an optical pickup 7 has a semiconductor laser 711 for generating a laser beam. An objective lens drive leads the laser beam to a predetermined position of a disk. The semiconductor laser and objective lens drive are mounted on a pickup hosing 70. The objective lens drive has a movable portion 74 and the movable portion has an objective lens 716 for condensing the laser beam on the recording face of the disk. A fixed portion 72 holds the movable portion through a support member. The fixed portion has a magnetic yoke 75. An extended portion formed by extending a part of the yoke to the fixed portion side and the upside 72*b* of a cutout formed at the intermediate portion of the fixed portion in the tracking direction are adhered and fixed.

6 Claims, 9 Drawing Sheets

OPTICAL PICKUP

BACKGROUND OF THE INVENTION

The present invention relates to an optical pickup for recording or reproducing information on or from an optical disk.

Patent Document 1 discloses a conventional objective lens actuator used for an optical pickup. The actuator disclosed in this official gazette elastically supports a yoke by two parallel leaf springs in order to absorb the vibration generated by a reactive force due to displacement of an objective lens. In this case, a support plate portion and a pair of substrate portions mutually almost horizontally arranged by keeping a proper interval under the support portion are set to an actuator base. Moreover, a plurality of adhesive joints are set to the support plate portion and a side of a bottom plate portion of the actuator base to decrease the resistance received by each adhesive joint and prevent removal from a housing due to vibration.

[Patent Document 1] JP-A-2002-150581 (pp. 1-3, FIG. 1)

BRIEF SUMMARY OF THE INVENTION

In the case of the actuator disclosed in the above Patent Document 1, the actuator and the housing of an optical pickup are fixed by a plurality of adhesive joints set to the both sides of an actuator base. In this case, when a fixed portion is formed of a resin and a pickup housing is formed of a metal, the fixed portion and the pickup housing have linear expansion coefficients different from each other. As a result, when an environmental temperature changes, the fixed portion having a large linear expansion coefficient is more extended than the pickup housing and the sidewall of the pickup housing is flared in the support-axis direction of the pickup housing. When the sidewall of the pickup housing is flared, an optical component set between an objective lens and a subsupport axis is tilted in a direction for alienating the component from an optical disk. The optical components are displaced to a position shifted from a predetermined position and a relative displacement between components occurs.

The present invention is made in view of the above problem of the prior art and its object is to keep or improve the reliability of an optical pickup even if an environmental temperature changes. Moreover, its object is to reduce a displacement due to an environmental temperature change of each components constituting the optical pickup.

An optical pickup leads a laser beam generated by a semiconductor laser to a disk through an objective lens to record or reproduce information in or from the disk. The optical pickup includes a movable portion having an objective lens, fixed portion for supporting the movable portion through support members and including a yoke, and a pickup housing for housing the fixed portion and movable portion. Moreover, in the case of this configuration, a side of the fixed portion or the yoke is fixed to the pickup housing to make it possible that the fixed portion is freely thermally-deformed when an environmental temperature changes.

In the above feature, it is also allowed that the yoke has an extended portion extended to the fixed-portion side, the fixed portion is adhered to the intermediate portion of the extended portion by an adhesive, or the intermediate portion in the tracking direction at a side of the fixed portion and the inner periphery of the pickup housing are fixed by an adhesive.

Moreover, the optical pickup includes a semiconductor laser for generating a laser beam for reproducing or recording information from or on a disk, an objective lens drive for leading the laser beam to a predetermined position, and a pickup housing for mounting the semiconductor laser and objective lens drive.

In the case of this configuration, the objective lens drive includes a movable portion having an objective lens for condensing the laser beam on the recording face of the disk and a fixed portion for holding the movable portion through support members and having a magnetic yoke to fix the extended portion formed by extending a beam for mounting the fixed portion formed on the pickup housing or a part of the yoke to the fixed-portion side and the upside of a cutout formed on the intermediate portion in the tracking direction of the fixed portion by an adhesive.

In the case of the above configuration, it is also allowed to adhere and fix the intermediate portion in the tracking direction of a side of an antimovable portion of the fixed portion to the inner wall of the pickup housing faced to the antimovable portion side by an adhesive or form gaps between the both ends in the tracking direction of the fixed portion and the pickup housing.

Moreover, in the case of the above configuration, it is allowed to adhere the fixed portion to the pickup housing by the both ends in the tracking direction so that the fixed portion can be deformed from one adhesive joint to the other adhesive joint when an environmental temperature changes or allowed that one of the adhesive joints is formed by using an adhesive having an elastic modulus higher than that of the other adhesive joint. Furthermore, it is allowed that one adhesive joint is formed so as to have a rigidity higher than that of the other adhesive joint. Furthermore, it is allowed to adhere any end of the fixed portion in the tracking direction to the pickup housing by an adhesive and the other end has a gap between the other end and the pickup housing.

According to the present invention, because a fixed portion is elastically set in the tracking direction, it is possible to decrease a force for the fixed portion to flare the sidewall of a pickup housing generated due to a change of environmental temperatures. Therefore, it is possible to decrease displacement of optical components due to an environmental temperature change and keep or improve the reliability of an optical pickup.

Other objects, features and advantages of the invention will become apparent from the following description of the embodiments of the invention taken in conjunction with the accompanying drawings.

DETAILED DESCRIPTION OF THE INVENTION

Figure 10:
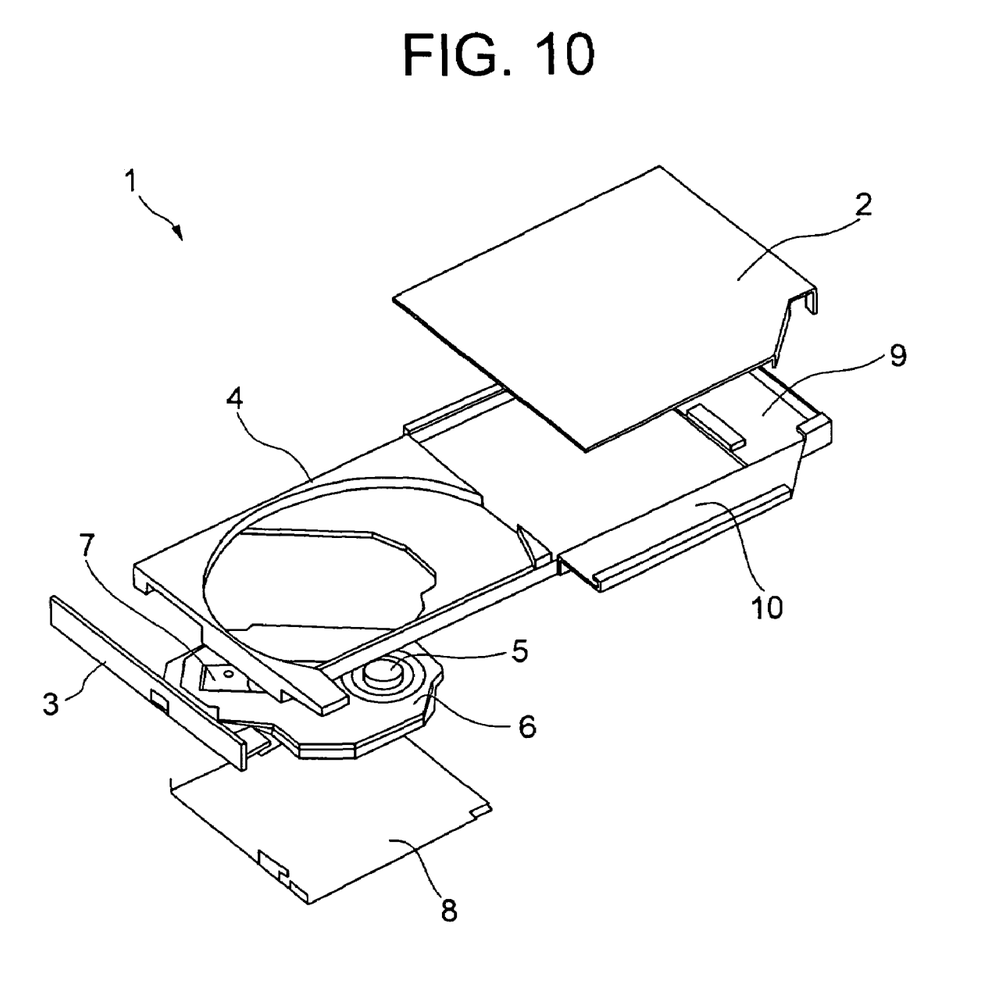
FIG. 10 is an exploded perspective view of a disk drive mounting the optical pickup shown in FIG. 1.

Embodiments of an optical pickup of the present invention are described below by referring to the accompanying drawings. FIG. 10 shows an exploded perspective view of a disk drive 1 mounting an optical pickup of the present invention. In the disk drive 1, a disk tray 4 on whose upside a disk serving as an information recording medium is mounted is attached to a bottom case 10 so as to be movable. A top case 2 is attached to the upside of the bottom case to prevent contact with other component and prevent dust from entering the disk drive 1.

A unit mechanism 6 to whose front side a front panel 3 is attached is mounted to the downside of the disk tray 4. The unit mechanism 6 is a mechanical portion formed into a unit, on which a spindle motor 5 for rotating a disk, an optical pickup 7 for recording or reproducing information on or from the disk, and an optical-pickup feed mechanism for moving the optical pickup 7 in the radius direction of the disk along guide axes (not shown) are mounted. The front panel 3 covers the front of the bottom case 10.

An undercover 8 is attached to the bottom of the unit mechanism 6. The undercover 8 prevents contact with other component and prevents dust from entering the unit mechanism 6 similarly to the case of the top case 2. A circuit board 9 is disposed to the innermost of the bottom case 10. Some semiconductor components for controlling driving of electronic components mounted on the disk drive 1 and processing signals are mounted on the circuit board 9.

Figure 1:
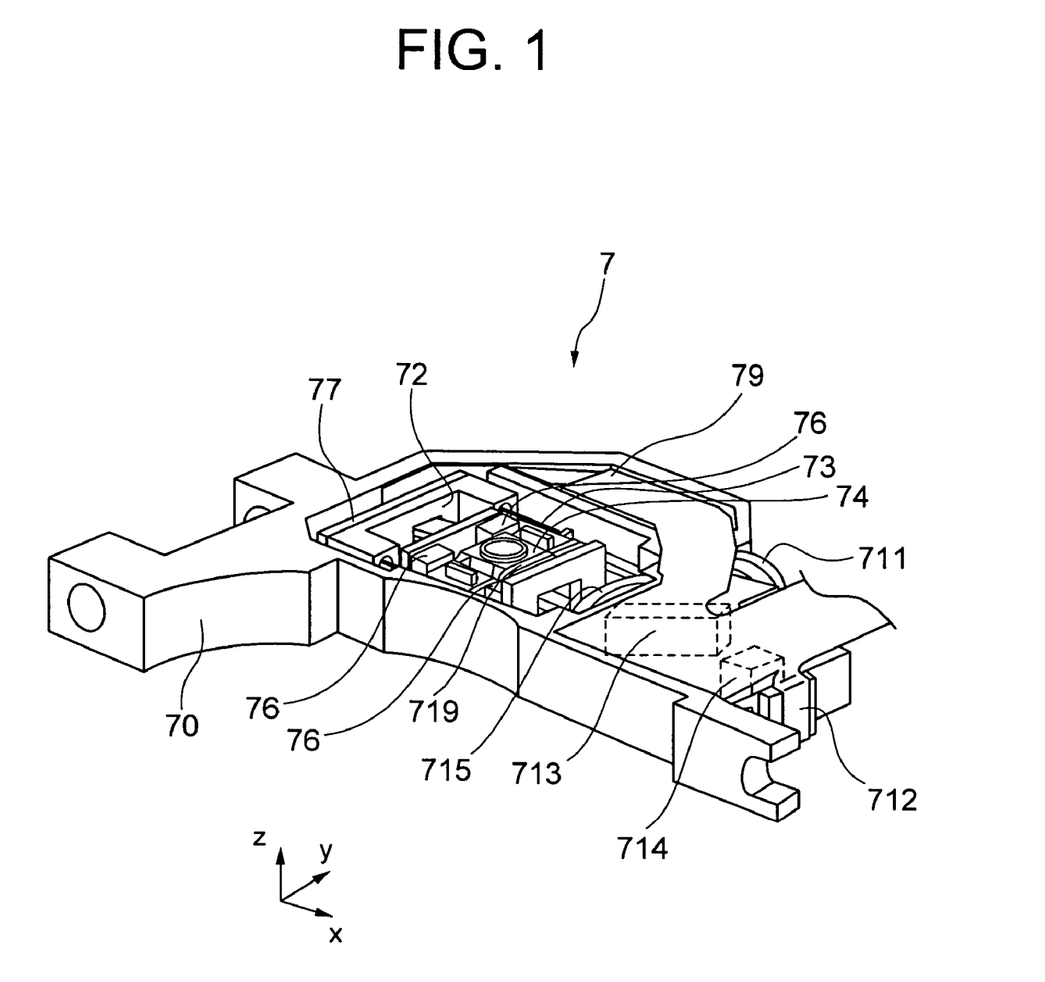
FIG. 1 is a perspective view of an embodiment of an optical pickup of the present invention.

FIG. 1 shows a perspective view of the optical pickup 7 to be mounted on the optical disk drive 1 shown in FIG. 10. The y-axis direction is the tracking direction which is the radius direction of a disk and z-axis direction is the focusing direction which is the optical axis direction. The x-axis direction is the direction orthogonal to these two directions y and z.

The optical pickup 7 has three factors of an objective lens drive 719, optical system, and flexible printed board 79. The objective lens drive 719 can drive an objective lens 716 in the focusing direction and tracking direction in order to accurately record or reproduce information by following the rotation of a disk. The objective lens drive has a magnetic circuit formed of a yoke 75 and permanent magnets 76, a movable portion 74 to which the objective lens 716 is mounted, a fixed portion 72 for holding the movable portion 74, and support members 73 for elastically supporting the movable portion 74.

Figure 2:
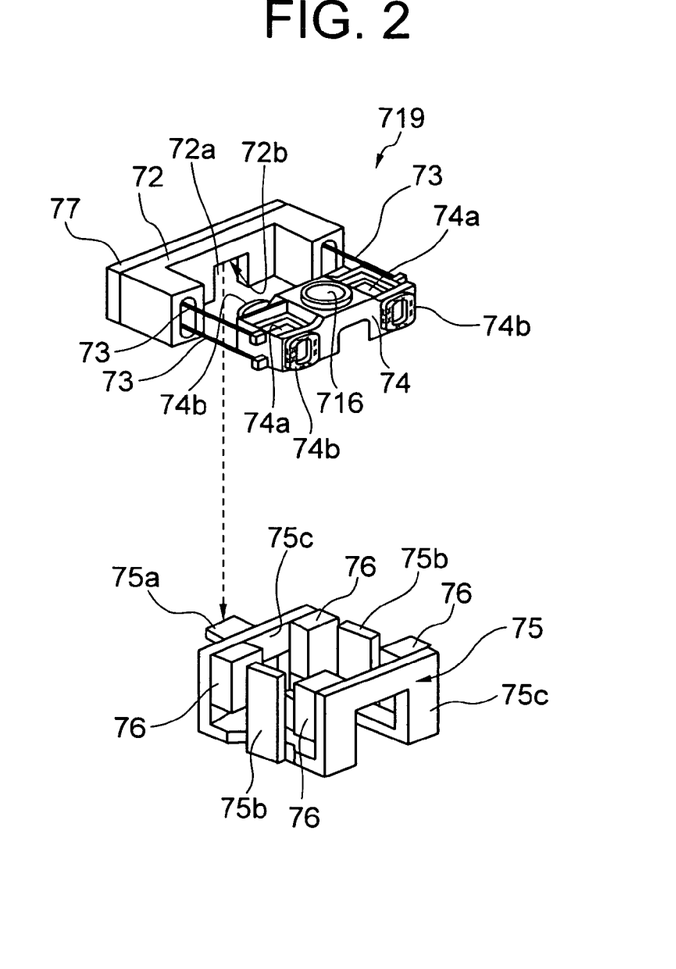
FIG. 2 is an exploded perspective view of an objective lens drive used for the optical pickup shown in FIG. 1.

Focusing coils 74a and tracking coils 74b are built in the movable portion 74 (refer to FIG. 2). An electromagnetic force is generated in accordance with the Fleming's law between the coils 74a and 74b and the permanent magnets 76 when supplying current to the coils 74a and 74b and the movable portion 74 is driven. The optical system has optical components such as a semiconductor laser 711 for emitting a laser beam, lenses 714 and 715 and mirror 713 for branching the light from the semiconductor laser or condensing the light on a disk, and an optical detector 712 for receiving the light reflected from the disk. These optical components are fixed to a pickup housing 70. The flexible printed board 79 electrically connects the objective lens drive 719 and optical system to the circuit board 9.

FIG. 2 shows an exploded perspective view of the detail of the objective lens drive 719 used for the optical pickup shown in FIG. 1. The focusing coils 74a and tracking coils 74b are set to the movable portion 74 for holding the objective lens 716.

One end of the wire-like support member 73 is fixed to the movable portion 74 and the other end of it is fixed to the fixed portion 72. In the movable portion 74, the focusing coils 74a are set to the both sides of the objective lens 716 and an erected portions 75b of the yoke 75 are inserted into the central spatial portions formed by the focusing coils 74a. The yoke 75 has a plurality of erected portions 75b and there are also erected portions 75c disposed to the both sides of the movable portion 74 in x-direction and opposite to the tracking coils 74b. The permanent magnets 76 are set to the erected portions 75b and 75c to form a magnetic circuit.

Figure 3:
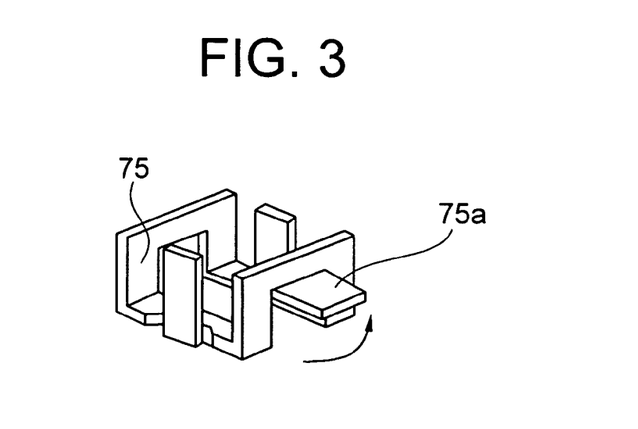
FIG. 3 is a perspective view of a yoke used for the optical pickup shown in FIG. 1.

In this embodiment, the extended portion 75a is formed on the yoke 75 of the objective lens drive 719. That is, as shown in FIG. 3, a cutout from the bottom to the middle is formed on one side of the erected portion 75c of the yoke 75 opposite to the tracking coils 74b and the cutout is bent upward as shown by an arrow. The intermediate portion of the extended portion 75a is fixed to the upper side 72b of a cutout portion 72a formed on the fixed portion 72 by an adhesive (refer to FIG. 2). Because the extended portion 75a formed by folding the yoke 75 is fixed to the fixed portion 72 by the adhesive 78 as shown in FIG. 4, a component for fixing is unnecessary.

Figure 4:
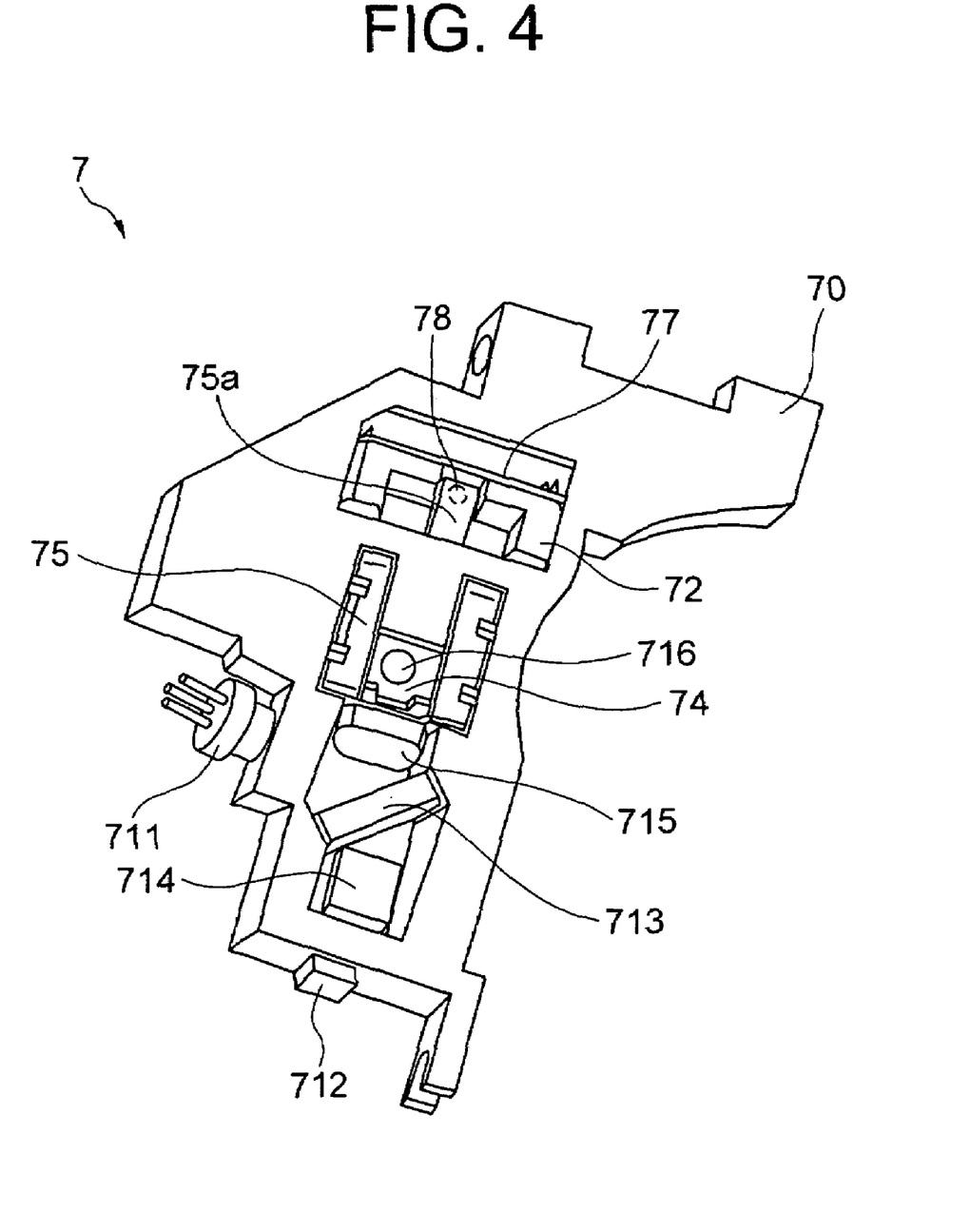
FIG. 4 is a perspective view of the optical pickup shown in FIG. 1.

FIG. 4 shows a perspective view of the optical pickup 7 viewed from below. The front end of the extended portion 75a formed by folding the yoke 75 is adhered to the pickup housing 70 by an adhesive. Thus, because the yoke 75 is adhered to the pickup housing 70, it is possible to fix and hold the objective lens drive 719 to the pickup housing 70. The fixed portion 72 is fixed to only the yoke 75 but it is not directly fixed to the pickup housing 70. According to this embodiment, because the both ends of the fixed portion 72 in the tracking direction are not restricted, the fixed portion 72 can be elastic to the both sides in the tracking direction while the adhesive joint 78 with the extended portion 75a of the yoke 75 is fixed even if an environmental temperature changes. Therefore, the fact that the fixed portion 72 expands and flares the sidewall of the pickup housing 70 is avoided and optical components of the pickup housing 70 do not tilt. As a result, it is possible to decrease a relative displacement between optical components.

Moreover, because an adhering position is located at central portion of the yoke 75 and fixed portion 72 in the tracking direction, the adhering position stays at the original position in the tracking direction even if an environmental temperature changes. That is, even if each component is deformed, the fixed portion 72 can be elastic by using the center of the fixed portion 72 as a start point. Therefore, the movable portion 74 supported by the support member 73 from the both ends of the fixed portion 72 is held at the central portion of the objective lens drive. Thereby, a displacement between the objective lens 716 and the optical system decreases.

By forming a concave portion at the lower side of the central portion of the fixed portion 72 and fixing and holding the extended portion 75a and the concave portion of the fixed portion 72 by an adhesive, it is possible to fix the fixed portion 72 to the pickup housing 70 without increasing the height of the optical pickup 7. Moreover, when fixing the extended portion 75a of the yoke 75 to the fixed portion 72, a displacement of the fixed portion 72 does not occur and the reliability is improved even if an impact at drop of the portion 72 is added by using not only an adhesive but also a pin or screw.

Figure 5:
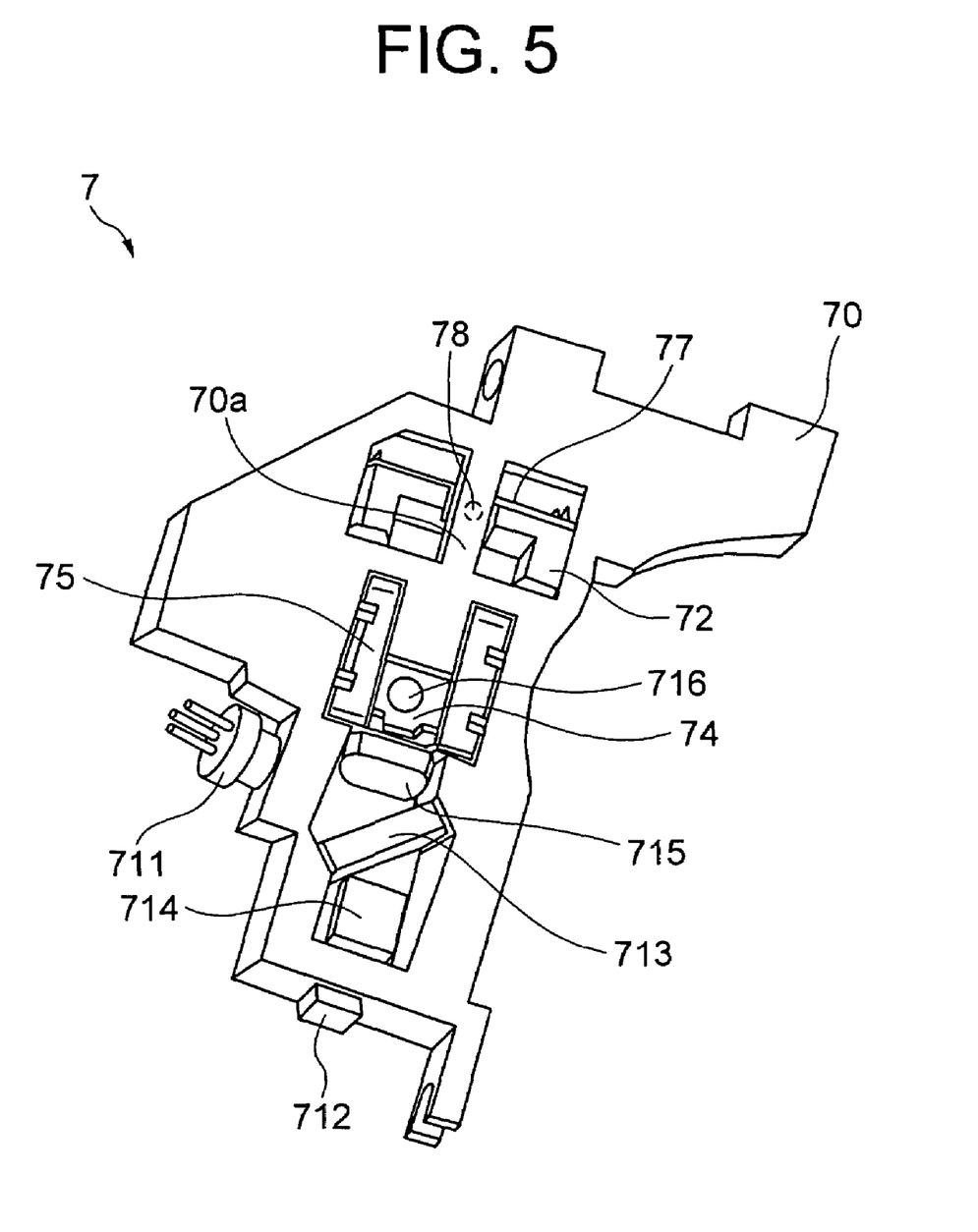
FIG. 5 is a perspective view of another embodiment of an optical pickup of the present invention.

FIG. 5 shows another embodiment of a pickup of the present invention. This embodiment is different from the above embodiment in that a beam 70a is formed on the pickup housing 70 at the bottom side of the fixed portion 72. The downside of the central portion of the fixed portion 72 and beam 70a are fixed by an adhesive 78. According to this embodiment, because the both ends of the fixed portion 72 in the tracking direction are not restricted, the fixed portion 72 can be elastic at the both sides in the tracking direction while keeping a adhering position with the beam 70a even if an environmental temperature changes. Thereby, an advantage same as that of the above embodiment can be obtained. Moreover, it is possible to maintain the symmetry of the movable portion 74 in the tracking direction, restrain an optical aberration, and improve the optical characteristic of the optical pickup 7.

Figure 6:
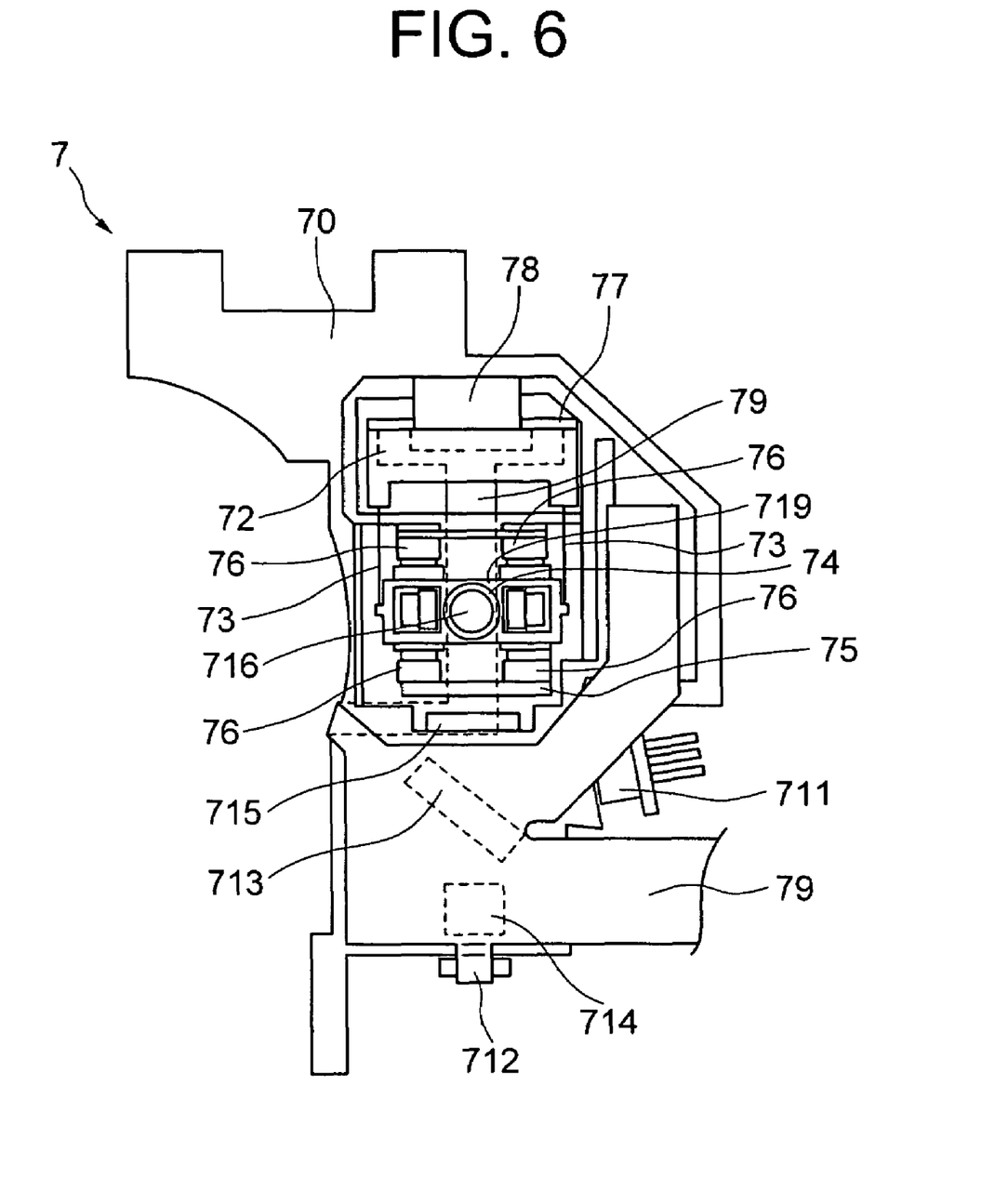
FIG. 6 is a top view of still another embodiment of an optical pickup of the present invention.

FIG. 6 shows a top view of still another embodiment of an optical pickup of the present invention. In the case of this embodiment, the adhering position between the fixed portion 72 and the pickup housing 70 is different from the case of each of the above embodiments. That is, a side parallel to the tracking direction of the fixed portion 72 and the sidewall of the pickup housing 70 opposite to the side are fixed by the adhesive 78.

According to this embodiment, because the both ends of the fixed portion 72 in the tracking direction are not restricted, the fixed portion 72 can be elastic at the both sides in the tracking direction while holding the adhering position with the pickup housing 70 even if an environmental temperature changes. Therefore, an advantage same as that of each of the above embodiments can be obtained. In the case of this embodiment, the flexible printed board 79 for supplying the current to be applied to the driving coil of a movable portion is divided into right and left by avoiding the adhesive 78. Moreover, the adhering position is set to the center of the fixed portion 72 in the tracking direction. Thereby, it is possible to maintain the symmetry of the movable portion 74 in the tracking direction.

Figure 7:
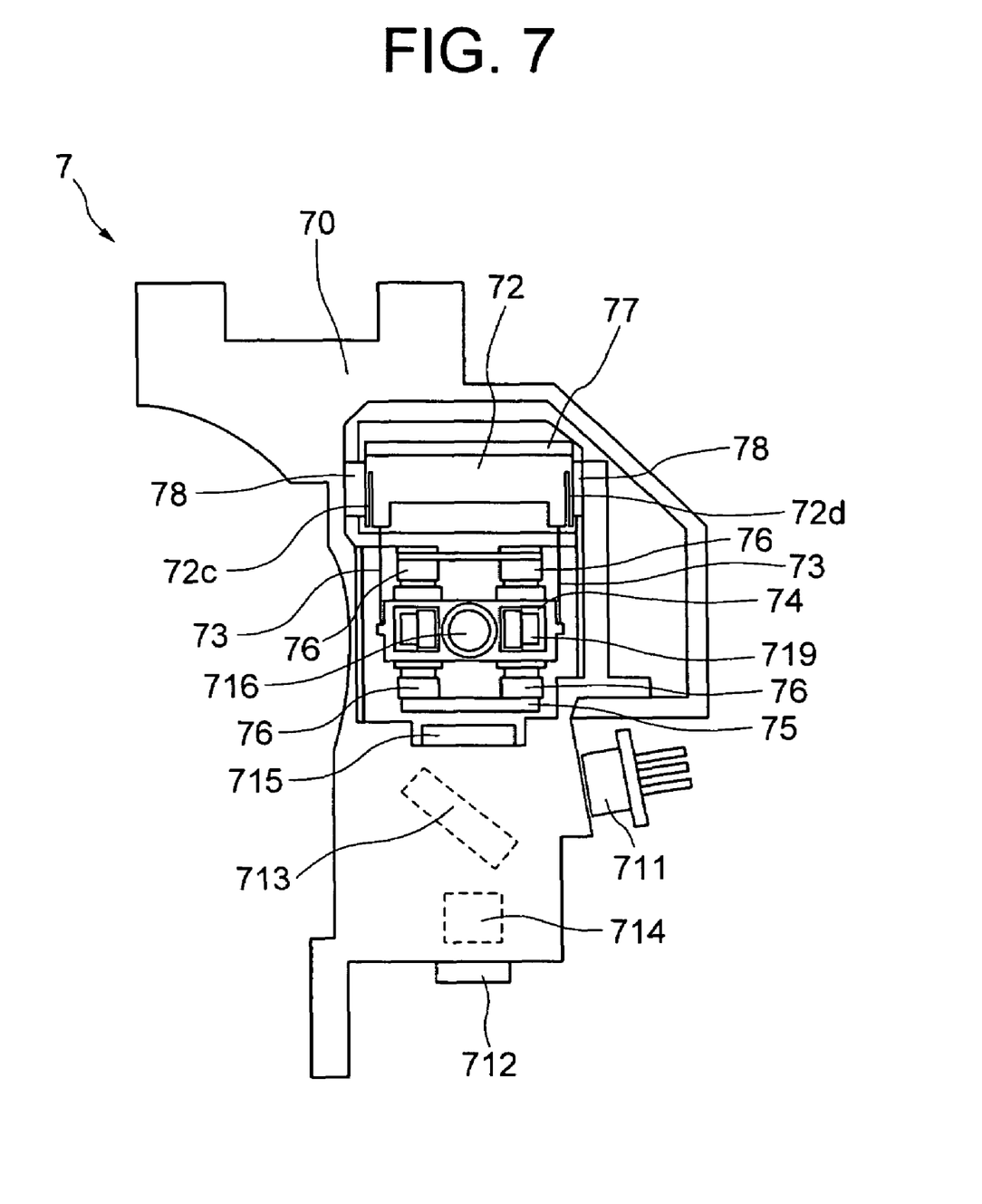
FIG. 7 is a top view of still another embodiment of an optical pickup of the present invention.

FIG. 7 shows a top view of still another embodiment of an optical pickup of the present invention. This embodiment is different from the above embodiments in that the both ends of the fixed portion 72 in the tracking direction are fixed and held to the sidewall of the pickup housing 70 by the adhesive 78. Because an adhering area can be sufficiently secured, the fixed portion 72 is not displaced even if an impact is added when the optical pickup 7 is dropped and it is possible to improve the reliability. In the case of the embodiment shown in FIG. 7, a slit is formed at the both ends of the fixed portion 72 in the tracking direction and small rigid deformed portions 72c and 72d are formed. Thereby, even if an environmental temperature changes, only the deformed portions 72c and 72d are deformed to absorb the elasticity between the fixed portion 72 and the adhesive 78. Therefore, it is possible to moderate a force working on the pickup housing 70 and restrain tilts of optical components.

By setting the deformed portions 72c and 72d to the outside of the support position of the support members 73 in the tracking direction, the rigidity of the inside portion of the fixed portion 72 fixing and holding the support members 73 increases. Thereby, it is possible to correspond to a change of environmental temperatures. In the case of this embodiment, the deformed portions 72c and 72d are formed at the both sides of the fixed portion 72. However, even if omitting either of the deformed portions 72c and 72d, the same advantage can be obtained. In this case, because the rigidity of one adhering portion is raised, the resonance point is improved.

Figure 8:
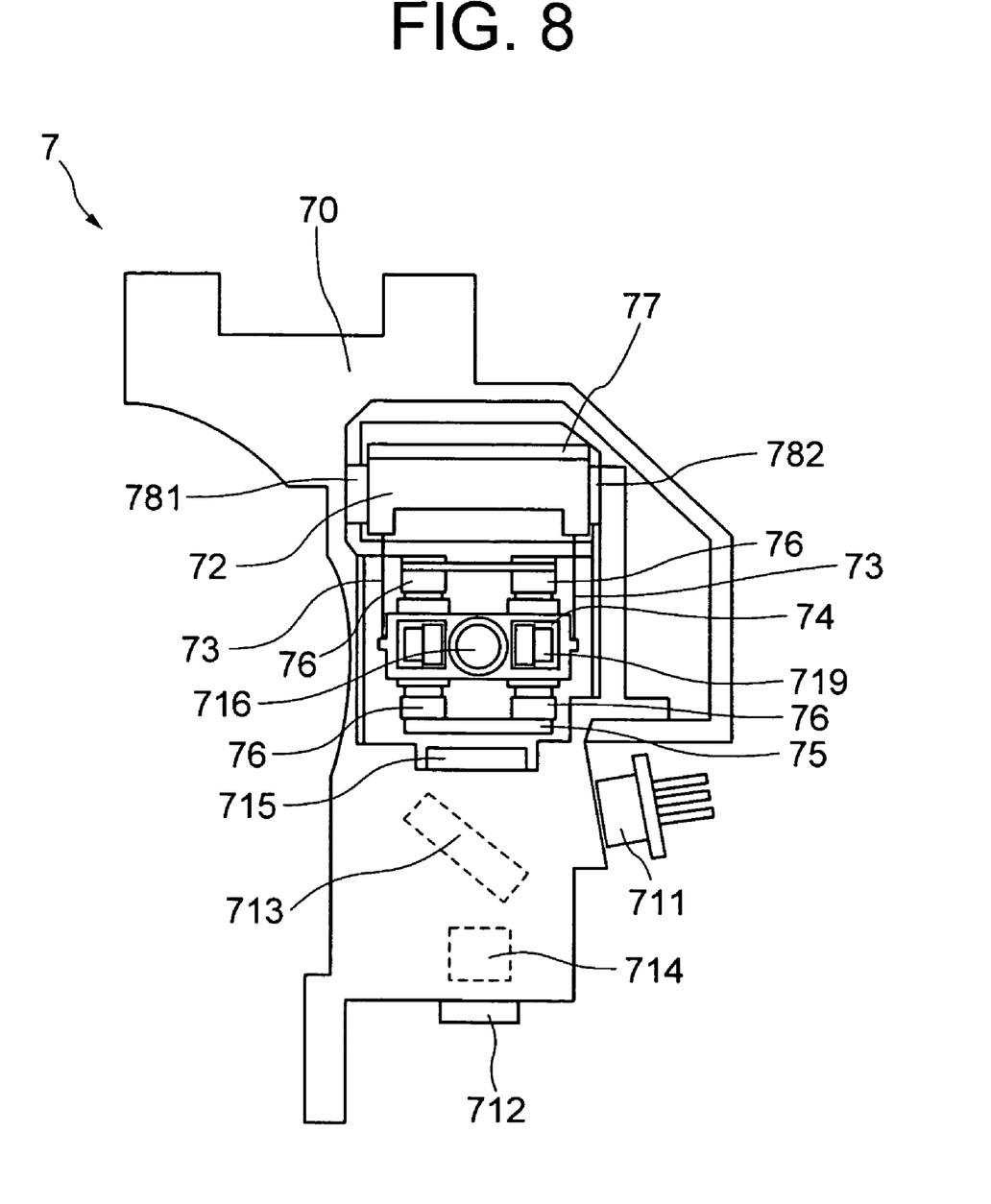
FIG. 8 is a top view of still another embodiment of an optical pickup of the present invention.

FIG. 8 shows a top view of still another embodiment of the present invention. This embodiment is different from the embodiment in FIG. 7 in that there is no slit and the elastic modulus of an adhesive is different. That is, adhesives 781 and 782 for fixing the fixed portion 72 and pickup housing 70 at their both ends have elastic moduluses different from each other. The adhesive 781 having an elastic modulus of tens of MPa is applied to one adhering end of the fixed portion 72 and the adhesive 782 having an elastic modulus of from hundreds of MPa to a few GPa is applied to the other end of the fixed portion 72.

According to this embodiment, because the elastic modulus of the adhesive 781 for fixing one end of the fixed portion 72 is small, the adhesive 781 is greatly deformed even if an environmental temperature changes to absorb the deformation of the fixed portion 72. Thereby, it is possible to moderate a force acting upon the pickup housing 70.

Figure 9:
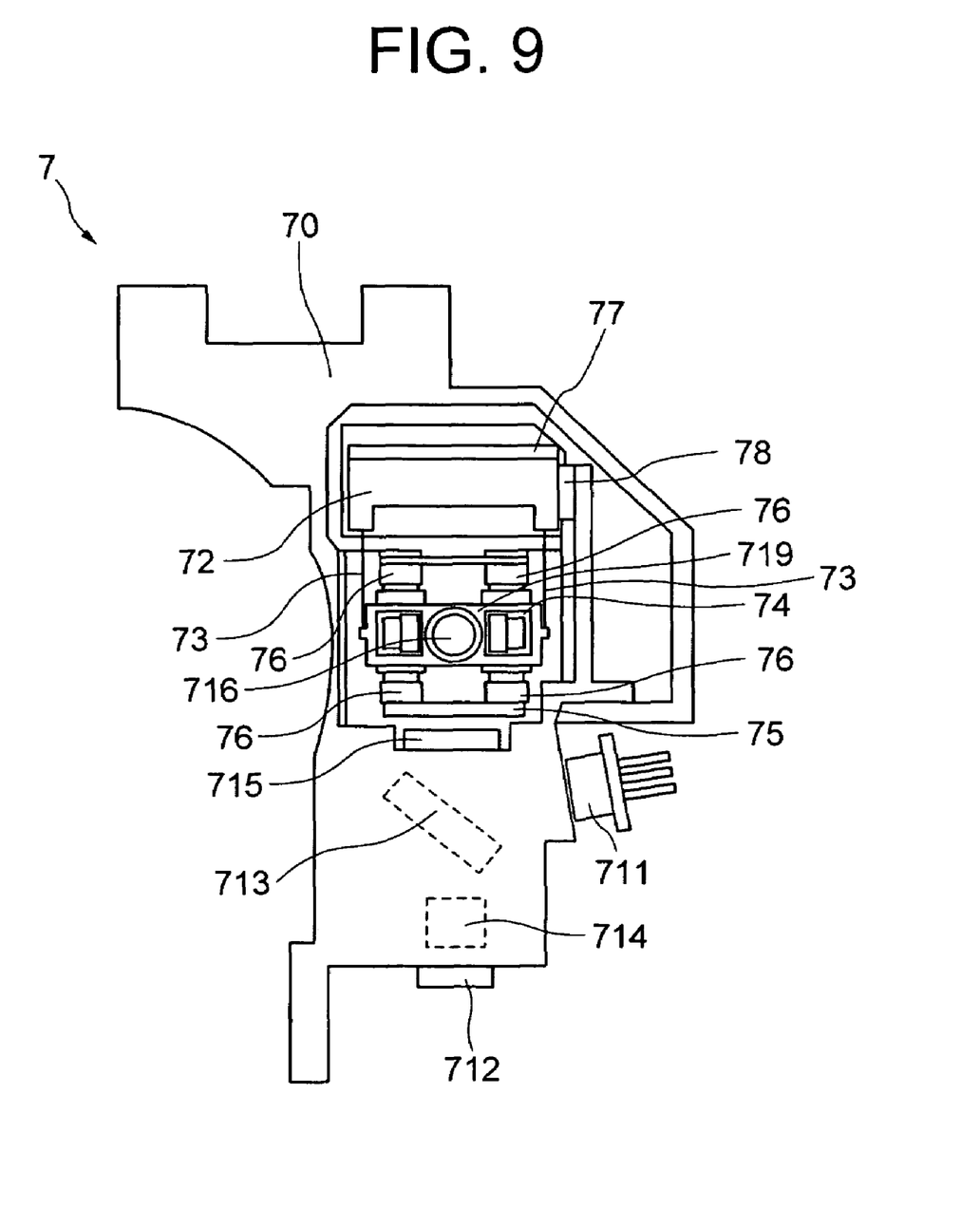
FIG. 9 is a top view of still another embodiment of an optical pickup of the present invention.

FIG. 9 shows a top view of still another embodiment of an optical pickup of the present invention. This embodiment is different from the embodiments shown in FIGS. 7 and 8 in that only one end of the fixed portion 72 in the tracking direction is fixed to the pickup housing 70 by the adhesive 78. According to this embodiment, because the other end of the fixed portion 72 in the tracking direction is not restricted, the fixed portion 72 can be elastic while holding the position of one end adhered to the pickup housing 70, even if an environmental temperature changes. Though the fixed portion 72 is adhered and fixed by an end in the tracking direction, it is also allowed to adhere and fix the fixed portion 72 at the inside.

Each of the above embodiments is constituted so that the fixed portion 72 can be elastic in the tracking direction while holding a position at which the fixed portion 72 is adhered to the pickup housing 70, even if an environmental temperature changes. Therefore, a state in which the fixed portion 72 expands and flares the sidewall of the pickup housing 70 is avoided and optical components of the pickup housing 70 do not tilt. As a result, it is possible to decrease relative displacements of the optical components.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup comprising:
    an objective lens drive for condensing a laser beam generated by a semiconductor laser on a recording face of a disk as a spot light for recording or reproducing information on or from the disk;
    wherein the objective lens drive includes an objective lens for condensing the laser beam, a movable portion for mounting the objective lens, a fixed portion for mounting the movable portion, a support member for elastically supporting the movable portion relative to the fixed portion, and a magnet and a yoke constructing a magnet circuit; and
    wherein the yoke has an extended portion, and the extended portion of the yoke is adhered to the fixed portion for the mounting of the movable portion in an adhering direction which extends in parallel to an optical axis of the objective lens.

2. An optical pickup according to claim 1, wherein the fixed portion has a concave surface on a lower side thereof.

3. An optical pickup according to claim 1, wherein the fixed portion has a plurality of erected portions, and the extended portion of the yoke is formed as a cutout on a side of at least one of the plurality of erected portions.

4. An optical pickup according to claim 1, wherein the extended portion of the yoke adhered to the fixed portion for mounting of the movable portion in the direction of the optical axis of the objective lens are adhered to one another along respective surfaces thereof which face one another and which extend in a direction perpendicular to the direction of the optical axis of the objective lens.

5. An optical pickup according to claim 1, wherein an upper surface of the extended portion of the yoke which faces a lower surface of the fixed portion is adhered to one another in the direction of the optical axis of the objective lens.

6. An optical pickup according to claim 5, wherein the upper surface of the extended portion and the lower surface of the fixed portion are adhered to one another by an adhesive.

* * * * *